G. LEVERICH.
Wheel for Vehicles.

No. 159,940.

2 Sheets--Sheet 1.

Patented Feb. 16, 1875.

Witnesses.
W. M. Edwards.
T. C. Smith.

Inventor.
G. Leverich.
per James Whitney,
Atty.

G. LEVERICH.
Wheel for Vehicles.

No. 159,940.

2 Sheets--Sheet 2.

Patented Feb. 16, 1875.

Witnesses
WM Edwards
T. C. Smith

Inventor
G. Leverich
per James A Whitney
Atty

UNITED STATES PATENT OFFICE.

GABRIEL LEVERICH, OF BROOKLYN, ASSIGNOR TO JOHN B. SAMMIS, OF NEW YORK, N. Y.

IMPROVEMENT IN WHEELS FOR VEHICLES.

Specification forming part of Letters Patent No. 159,940, dated February 16, 1875; application filed January 16, 1875.

*To all whom it may concern:*

Be it known that I, GABRIEL LEVERICH, of Brooklyn, in the county of Kings and State of New York, have invented certain Improvements in Elastic Hubs, &c., of which the following is a specification:

This invention relates to that class of hubs for carriage and other wheels in which the box or bearing for the skein or axle is cushioned at one or both ends with india-rubber, in order to diminish the strain and concussion upon the skein or axle incident in the ordinary use or operation of the wheel.

The invention comprises a novel combination, with the wheel-hub, the elastic cushions, and the box or bearing, of a recessed or slotted annulus, and a radial spur extending therein from the aforesaid box or bearing, whereby the requisite rotation of the latter with the hub, without interference with the operation of the elastic cushions, is provided for. The invention further comprises a novel combination, with the wheel-hub, the elastic cushions, and a box or bearing having a suitable external shape, of an adjusting-nut and screw-thread, whereby the aforesaid cushions may be compressed in a longitudinal direction at will, to insure any desired tension thereof against the endwise movement of the box or bearing when the whole is subjected to lateral jar or concussion. The invention further consists in a novel combination, with the hub, the elastic cushions, and the box or bearings, of an internal sleeve, arranged around but at some distance from the box or bearing aforesaid, in order to permit the requisite play of the latter, and covering the inner end of the spoke-mortises of the hub, whereby compensation is made for the weakening of the hub incident to the hollowing out thereof, to provide for the reception and operation of the cushioned box or bearing, and whereby, at the same time, the inward projection of the spokes to interfere with the movement of the box or bearing incident to the yielding of the cushions during the use of the wheel is prevented. The invention further comprises a novel combination of parts whereby the most efficient operation of the cushioned box or bearing is insured, in connection with a very great degree of permanence and durability in the entire device.

Figure 1:
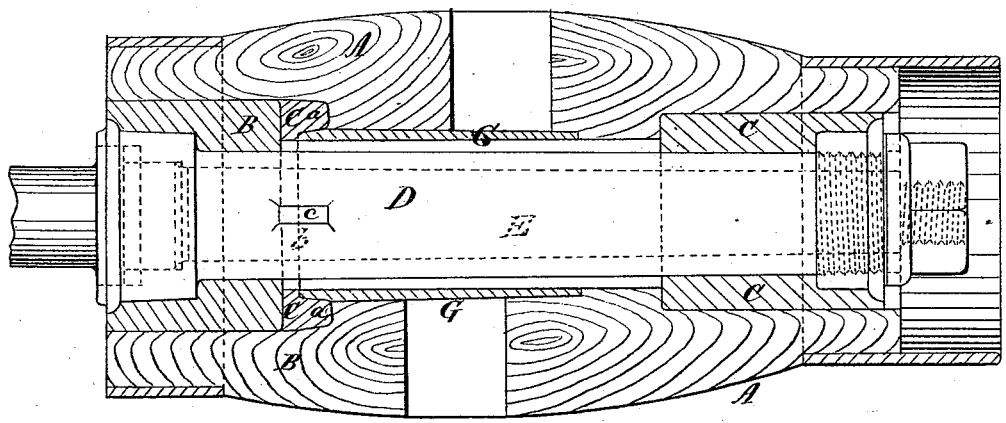
Figure 2:
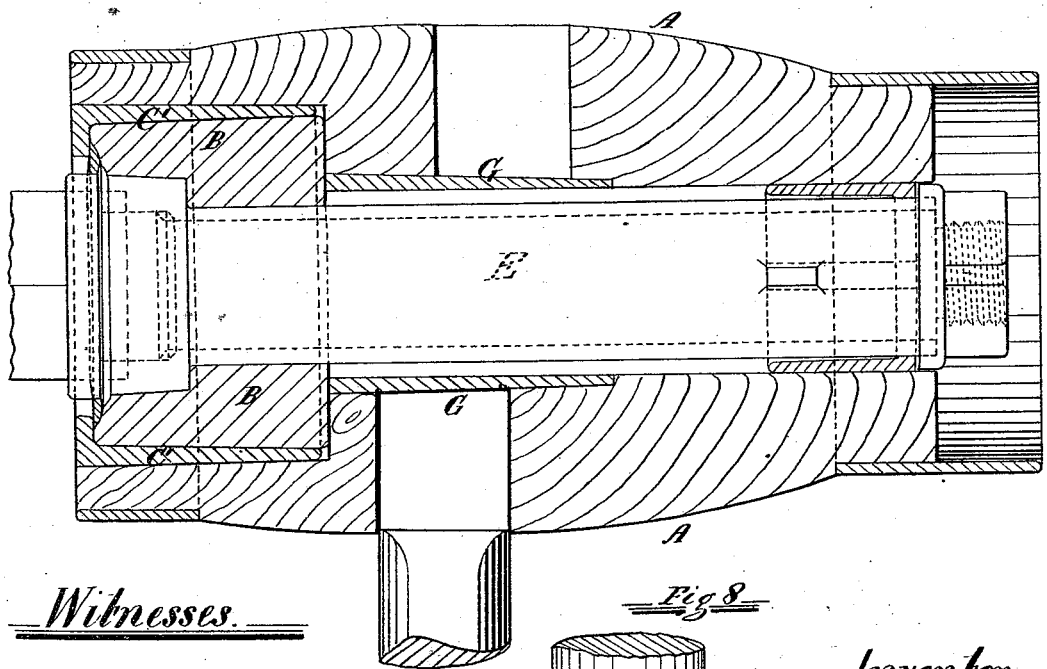
Figure 8:
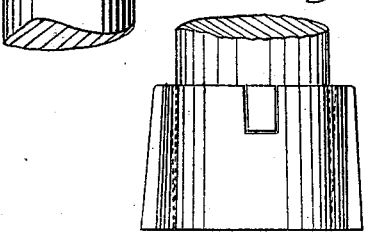
Figure 3:
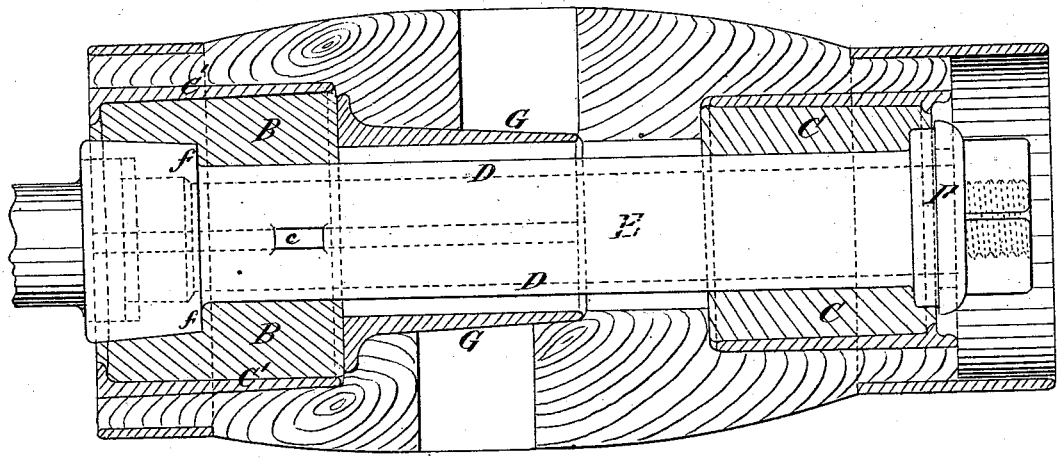
Figures 4, 7:
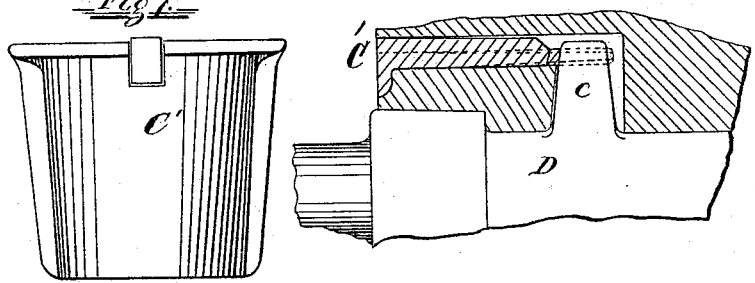
Figures 5, 6:
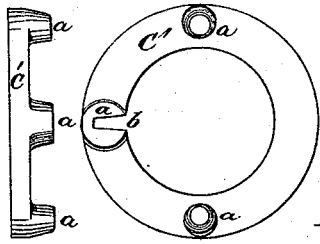

Figures 1, 2, and 3 are central longitudinal sectional views of hubs embracing different modifications of my inventions. Fig. 4 is a detached sectional view on a larger scale of one portion of the invention, as shown in Fig. 3, taken in a plane at right angles to the latter; and Fig. 5 is a similar view of the modification shown in Fig. 1. Figs. 6, 7, and 8 are detached views of separate parts of the apparatus.

Having reference to Fig. 1, A is the hub, counterbored at each end to receive the elastic cushions B C. Between the cushion B, at the inner end of the hub, and the inner end of its counterbore, is an annulus, C', formed with spurs $a$, that fit into recesses formed in the wood of the hub, and thereby prevent the annulus C' from turning within the latter. This annulus has a notch or slot, $b$, formed in its edge. Into this slot projects a radial spur, $c$, provided on the outer surface of the box or bearing D. This is what is commonly termed a pipe-box, and extends through the bore of the hub from end to end, the said box being chambered or enlarged to provide for the requisite movement of the box D in directions radial to the axis of the hub. The journal or skein E of the axle passes through the box in the usual manner. The skein at its inner end is constructed with one or more circumferential shoulders, $f$, bedded in rabbets of corresponding shape provided in the elastic cushion B. At the opposite extremity the box has an external screw-thread, upon which is screwed the nut F, which is bedded in suitably-shaped rabbets in the end of the adjacent cushion C. By turning this nut inward the cushions are compressed to any desired degree, and their elasticity may be regulated at will, to relieve the box, and consequently the journal or skein within it, from longitudinal strain and concussion that would otherwise be brought thereon by the lateral jarring of the wheel when in use. The cushions, being elastic, of course yield under the downward pressure of the skein, while the same is rotated with the movement of the hub by the holding of the radial spur $c$ in the recess $b$ of the annulus C', which, as hereinbefore explained, is firmly attached to the hub itself. This connection of the box with the hub permitting the movement of the former radially from the axis of the latter, the perfect operation of the cushions in preventing vertical jarring of the box, and consequently of the journal and the parts supported thereby, is provided against. When preferred, the annulus may be made to entirely surround the cushion B, as represented in Fig. 3, in which case the attachment of the annulus to the hub is provided for by radial ribs $c'$ on the annulus, (shown in Fig. 7,) fitted into corresponding recesses provided in the receiving or counterbored adjacent portion of the hub. This arrangement last described is shown more in detail in Fig. 4. In some cases—as, for example, when the hub is to be used for wheels of heavy vehicles—the inner end only of the hub may be cushioned, in which case the annulus and spur may be arranged at that end of the hub devoid of a cushion, as shown in Fig. 3.

Inasmuch as the bore of the hub must be of sufficient diameter to permit the hereinbefore-described radial movement of the box, the hub itself would be much weakened if no extra means were provided to compensate for the wood removed. Moreover, if the spoke-mortises were left open at their inner ends, the driving in of the spokes would in many cases cause them to project inward so far as to prevent the proper working of the box. In order to obviate both of these drawbacks, an internal metallic sleeve, G, of sufficient internal diameter to permit the play of the box D within it, is driven into the central or chambered portion of the hub, thus providing a cylindrical brace within the hub, and closing the inner ends of the spoke-sockets, to prevent the inward thrust of the spokes to an extent capable of interfering with the operation of the box D, cushioned as set forth. This sleeve G may either be made separate from the annulus $C'$, as shown in Fig. 3, or it may be formed in one therewith, when preferred.

When desired, the elastic cushions B C, either or both, may be surrounded by metallic shells N, as shown in Figs. 2 and 3, the said shells being fitted into the counterbored end portions of the hub A, and serving, in hubs designed for heavy vehicles, to more securely retain the elastic cushion or cushions in place.

What I claim as my invention is—

1. The recessed or slotted annulus $C'$ and the radial spur $c$ of the box or bearing D, in combination with the hub A and a cushion or cushions, the whole to operate substantially as and for the purpose set forth.

2. In an elastic hub, the combination of the internal sleeve G, to permit radial play of the box or bearing D, with the said bearing, and one or more elastic cushions, B or C, the said sleeve to close the inner ends of the spoke-mortises, all substantially as and for the purpose set forth.

3. The elastic hub comprising the box or bearing D, with one or more circumferential shoulders, provided with the nut F at its outer end, and having the radial spur $b$, one or more elastic cushions, B C, the annulus $C'$, and the sleeve G, to permit radial play of the box D, all combined for operation substantially as and for the purpose set forth.

GABRIEL LEVERICH.

Witnesses:
JAMES A. WHITNEY,
W. M. EDWARDS.